US010057242B2

(12) United States Patent
Dube

(10) Patent No.: US 10,057,242 B2
(45) Date of Patent: Aug. 21, 2018

(54) LOCATION AUTHENTICATION USING MULTISPECTRAL IMAGING

(71) Applicant: Roger R Dube, Pittsford, NY (US)

(72) Inventor: Roger R Dube, Pittsford, NY (US)

(73) Assignee: Digital Authentication Technologies, Inc., Boca Raton, FL (US)

( * ) Notice: Subject to any disclaimer, the term of this patent is extended or adjusted under 35 U.S.C. 154(b) by 205 days.

(21) Appl. No.: 15/225,703

(22) Filed: Aug. 1, 2016

(65) Prior Publication Data
US 2017/0134372 A1    May 11, 2017

Related U.S. Application Data

(60) Provisional application No. 62/199,829, filed on Jul. 31, 2015.

(51) Int. Cl.
*H04L 29/06* (2006.01)
*G06K 9/46* (2006.01)

(52) U.S. Cl.
CPC ........ *H04L 63/0823* (2013.01); *G06K 9/4652* (2013.01); *H04L 63/10* (2013.01); *G06F 2221/2111* (2013.01); *G06K 2209/03* (2013.01); *H04L 63/0272* (2013.01)

(58) Field of Classification Search
CPC .................................................. H04L 63/0823
USPC .............................................................. 726/4
See application file for complete search history.

(56) References Cited

U.S. PATENT DOCUMENTS

| 6,269,246 B1 * | 7/2001 | Rao ........................ G01S 5/0252 |
| | | 455/186.1 |
| 9,069,069 B2 * | 6/2015 | Freund .................... G01S 19/14 |
| 2015/0220767 A1 * | 8/2015 | Yoon .................. G06K 9/00006 |
| | | 382/124 |

* cited by examiner

*Primary Examiner* — Longbit Chai
(74) *Attorney, Agent, or Firm* — Patent Venture Group; Joe A. Brock, II

(57) ABSTRACT

An invention is provided for authentication in a network environment. The invention includes displaying an authentication image on a display device, and generating a captured image by capturing an image using a client device. The captured image then is analyzed to determine color band values of selected pixels of the captured image. Once analyzed, a comparison result is generated by comparing the color band values the selected pixels of the captured image to color band values of corresponding pixels of the authentication image. If the comparison result is within a predetermined threshold authentication is provided.

12 Claims, 3 Drawing Sheets

LOCATION AUTHENTICATION USING MULTISPECTRAL IMAGING

CROSS REFERENCE TO RELATED APPLICATIONS

This application claims the benefit of U.S. Provisional Patent Application having Ser. No. 62/199,829, filed on Jul. 31, 2015, and entitled "Location Authentication Using Multispectral Imaging," which is hereby incorporated by reference.

BACKGROUND OF THE INVENTION

1. Field of the Invention

This invention relates generally to network security and more specifically to a system and method for authenticating the location of a remote device user seeking electronic access to a host device using multispectral imaging.

2. Description of the Related Art

The use of public and private networks has fundamentally altered the manner in which business enterprises and government agencies communicate and conduct business. For example, the Internet, intranets and extranets are used to store, analyze and transmit information between and within organizations, and permit interactive, local, national or global communication on a real-time basis. Moreover, these networks are now used for electronic business-to-customer retail commerce and for electronic business-to-business commerce of all types.

In order to achieve its full potential, however, e commerce must overcome numerous security and related issues, including concerns relating to hacker attacks, merchant impersonation, data confidentiality and integrity, fraud, and transaction repudiation. Key to all of these problems is the need to authenticate a user's identity in a manner that is extremely difficult or impossible to defeat.

In view of the foregoing, there exists a need for enhanced authentication of the identity of a person initiating an electronic transaction, electronic file, document, or accessing an electronic file, document, or database. Such authentication should preferably occur on a real-time basis, at the time of the user's initial entry into a protected space. Moreover, such authentication should preferably include an automatic expiration after a preset period of time, requiring the user to re-authenticate themselves, in order to avoid the compromise of the system by physical attack.

SUMMARY OF THE INVENTION

Broadly speaking, embodiments of the present invention address these needs by providing a location-specific authentication system that authenticates remote users of protected network resources using image data values from an image displayed at a specific space in which the user must be located. The user is required to capture an image of a displayed security image, typically using a camera. The selected image data from the captured image is then sent to an authentication server for user authentication.

In one embodiment, a method for providing authentication in a network environment is disclosed. The method includes displaying an authentication image on a display device, and generating a captured image by capturing an image using a client device, such as a smartphone. The captured image then is analyzed to determine color band values of selected pixels of the captured image. Once analyzed, a comparison result is generated by comparing the color band values the selected pixels of the captured image to color band values of corresponding pixels of the authentication image. If the comparison result is within a predetermined threshold authentication is provided, such as issuing a session certificate.

In a further embodiment, a system for providing authentication in a network environment is disclosed. The system includes a display device that displays an authentication image. A client device, such as a smartphone, generates a captured image by capturing an image, typically via a camera located on the client device. A computer program executing on a processor analyzed the captured image to determine color band values of selected pixels of the captured image. The system also includes a processor programmed to generate a comparison result by comparing the color band values the selected pixels of the captured image to color band values of corresponding pixels of the authentication image. An authentication server provides authentication if the comparison result is within a predetermined threshold, such as issuing a session certificate.

In this manner, embodiments of the present invention provide location-specific authentication without the need of specific geo-location information of the remote user, the use of RF signals propagating through surrounding walls from a distant source, or transmitting or receiving specific Global Positioning System (GPS) coordinates. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a location-specific authentication system that authenticates remote users of protected network resources using image data values from an image displayed at a specific space in which the user must be located. The user is required to capture an image of a displayed security image, typically using a camera. The selected image data from the captured image is then sent to an authentication server for user authentication. In this manner, embodiments of the present invention provide location-specific authentication without the need of specific geo-location information of the remote user, the use of RF signals propagating through surrounding walls from a distant source, or transmitting or receiving specific Global Positioning System (GPS) coordinates.

In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention. Moreover, the terms Bluetooth, VPN, and smartphone are utilized in the description below by way of example and are not intended to limit the present invention in any way.

In a previous disclosure, a system was disclosed in which remote (e.g., satellite or distant cell phone tower) external signals propagate to one or more receivers placed in secure locations. As these signals propagate into the space, through the building superstructure, the intervening material along lines of sight add delays, absorb, or otherwise scatter the signals, causing a net attenuation in signal strength in specific directions due to these intervening building-specific materials. The net effect of these materials can be statistically characterized over time, creating a static two dimensional image of this effect in various directions. Sources that move over time provide additional benefit by allowing the gradual development of progressively more complete images.

Unfortunately, that the Sun can create space weather storms during periods of high solar activity (flares, sunspots, coronal holes, etc.). Sufficiently strong storms can be geo-affective—that is, they can directly impact satellite signals, telecommunication, and other satellite based systems, and have been known to induce fluctuations in the power grid. In the authentication system described above, the impact of such space weather is to increase the noise of the signals, thereby affecting the false positive and false negative authentication rates. These storms can also render the process of characterizing a room (in which the radio frequency (RF) image mentioned above is compiled over an extended period of time) difficult or nearly pointless. This can affect the subsequent deployment of this technology during such storms.

Figure 1:
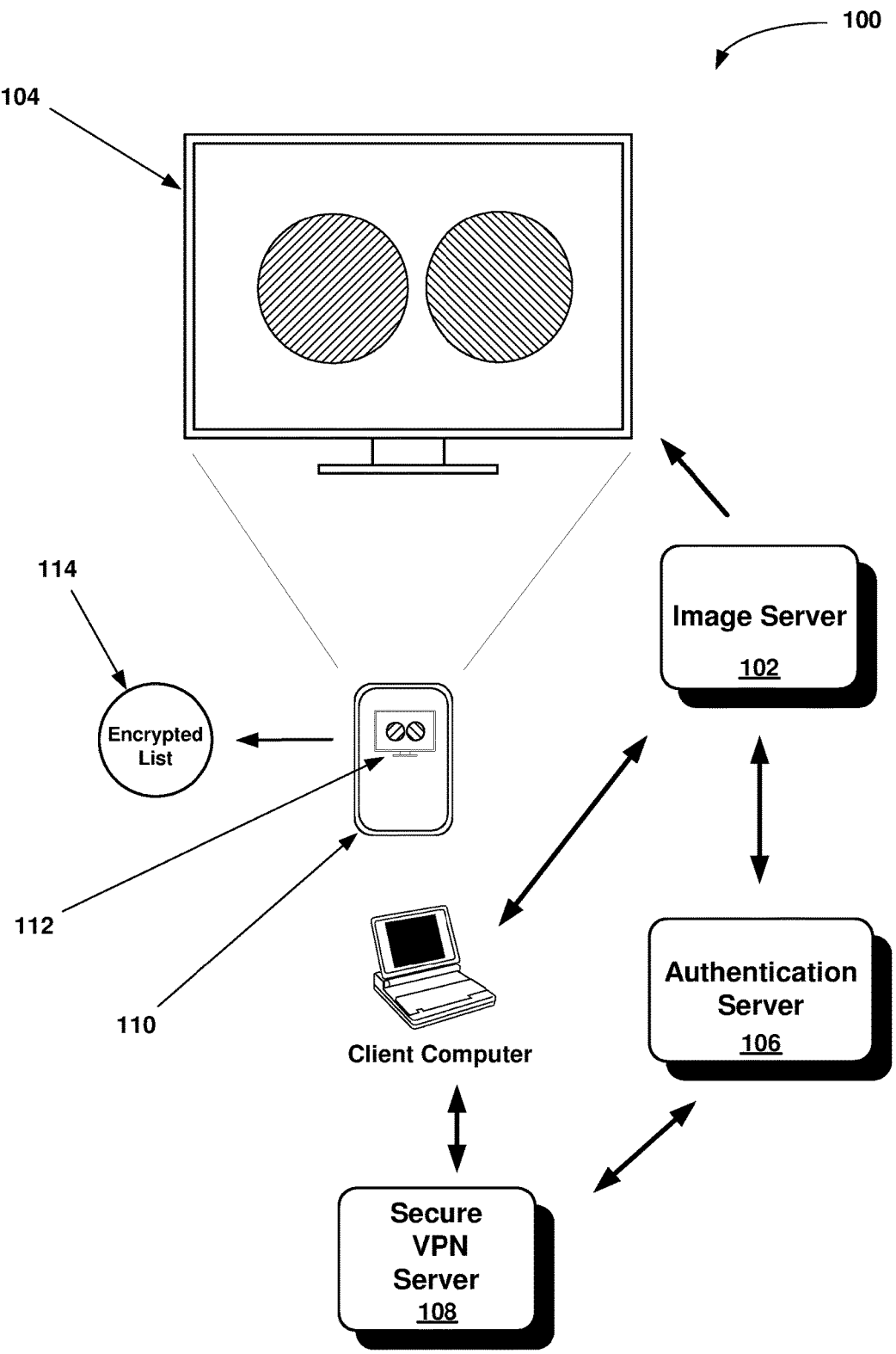
FIG. 1 is an illustration showing a multispectral imaging authentication system, in accordance with an embodiment of the present invention.

Thus, embodiments of the present invention provide authentication of the identity of a person initiating an electronic transaction, electronic file, document, or accessing an electronic file, document, or database in a manner that does not employ radio frequency signal propagation for the characterization or subsequent recognition of a location. FIG. 1 is an illustration showing a multispectral imaging authentication system 100, in accordance with an embodiment of the present invention. The multispectral imaging authentication system 100 includes an image server 102 in communication with a display device 104 and an authentication server 106. The authentication server 106 is further in communication with a secure virtual private network (VPN) server 108, which controls access to protected data.

The display device 104 can be any type of device capable of displaying images such as an LCD screen, TV, plasma TV. In operation, the display device 104 is used to display a static or dynamically changing sequence of colorful, complex authentication images. Ideally, the display device 104 is located in a protected room such that it is not visible to anyone outside the room, even if the door is open. Any of a variety of techniques can be used to require that a person be physically within the space before such a display becomes visible.

The remote image server 106 is connected by a VPN to a computer located in a protected space and sends a stream of complex colorful authentication images to the local display device 104, changing those images once every preset period of time (for example, once every 30 minutes). The remote image server 102 may have a library of one or more such images that it can switch the image to at random for each display period. A record of the image and the time during which it is displayed can be recorded in a local database on the image server 102.

In one embodiment, a user is granted access to the protected room and must authenticate that they are indeed in the protected room before the user obtains a session certificate from the authentication server 106 that enables the user to connect to the secure VPN server 108 on which reside the files that are being protected. The user begins with a secure VPN connection to the remote image server 102 (or, alternatively, to a local image server) through which authentication data will be sent to the remote authentication server 106.

Each pixel of the displayed authentication image on the display device 104 has a specific combination of red, green and blue component color values (or other 3-coordinate measurements) that creates the sensation of the desired color in the eye of the viewer. In one embodiment of the present invention, the user employs a smartphone 110 running an application associated with the disclosed authentication system 100. This application captures an image 112, typically using a built in camera, of the currently displayed authentication image on the display device 104. The application then selects a list of random (or previously assigned) rows and columns and measures the values of the red, green and blue component color values (or other 3 coordinate system).

Figure 2:
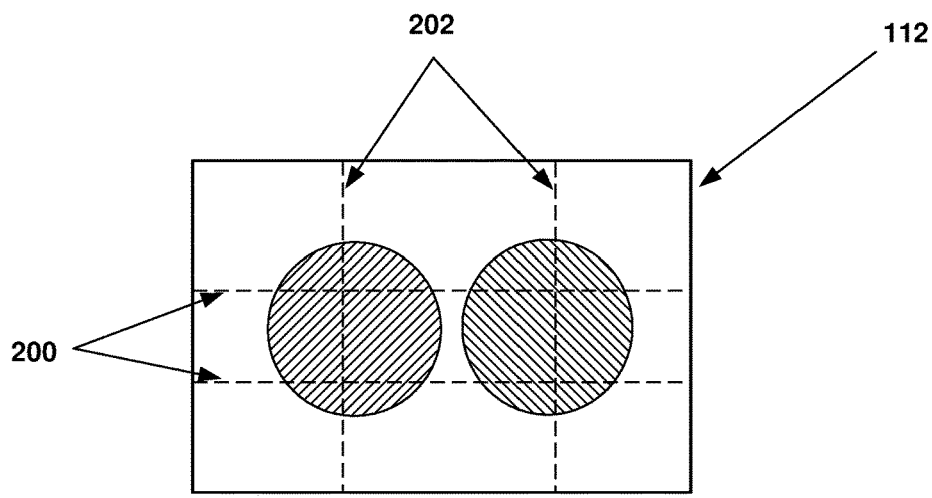
FIG. 2 is a diagram showing an exemplary captured image illustrating exemplary selected rows and columns of pixels, in accordance with an embodiment of the present invention.

FIG. 2 is a diagram showing an exemplary captured image 112 illustrating exemplary selected rows 200 and columns 202 of pixels, in accordance with an embodiment of the present invention. As shown in FIG. 2, the application selects a list of random (or previously assigned) rows 200 and columns 202. Each row 200 and column comprises a plurality of pixels, as shown in FIG. 3.

Figure 3:
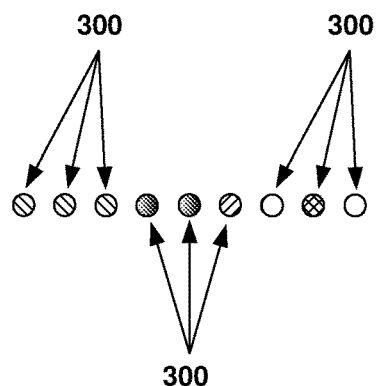
FIG. 3 is a diagram showing an exemplary row of pixels of a captured image, in accordance with an embodiment of the present invention.

FIG. 3 is a diagram showing an exemplary row 200 of pixels 300 of a captured image, in accordance with an embodiment of the present invention. Each row 200 and column of the captured image comprises a plurality of pixels 300. Each pixel 300 of the captured image is the smallest addressable element and thus the smallest controllable element of a picture represented on the device. Each pixel is comprised of a plurality of color band values, as described next with reference to FIG. 4.

Figure 4:
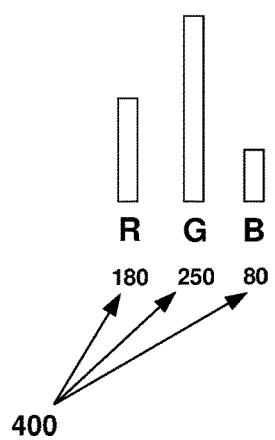
FIG. 4 is a diagram showing exemplary color band values of an exemplary pixel, in accordance with an embodiment of the present invention.

FIG. 4 is a diagram showing exemplary color band values of an exemplary pixel, in accordance with an embodiment of the present invention. As stated previously, each pixel is comprised of a plurality of color band values. For example, in FIG. 4, each pixel comprises three color band values 400, namely, red, green, and blue. Each color band value determines the amount of that particular color component that should be added to the color of the pixel. For example, in FIG. 4, the red color band value is 180, the green color band value is 250, and the blue color band value is 80. Each of these color band values 400, when added together, determine the color of the pixel. Embodiments of the present invention utilize these color band values 400 to provide authentication.

To assist in mapping the image 112, embodiments of the present invention can utilized several different techniques.

For example, in one embodiment a larger neighborhood of pixels is used to minimize registration difficulty. Additionally, the smartphone 110 can be mechanically constrained to always take the same picture from a predefined position. Further, registration pixels within the image displayed on the display device 104 can be fully saturated such that they appear bright white in order to simplify scaling, rotation and registration of the images. Any of the above techniques, or none, can be utilized to assist in mapping the image 112, depending on the needs of the particular situation in which embodiments of the present invention are used.

Turing back to FIG. 1, once the image is captured and analyzed, the application encrypts the list and sends the encrypted complete list 114, including a timestamp, to the remote authentication server 106. Software on the remote authentication server 106 compares the received red, green and blue component color values (or other 3 coordinate system) for each of the pixel locations selected to the red, green and blue component color values (or other 3 coordinate system) of the original source authentication image displayed on the display device 104 during the particular time indicated by the timestamp. A match, to some degree of confidence, results in the authentication server 106 issuing a session certificate to the user (or client computer). The user then is able to gain entry to the protected VPN server 108 on which the protected files reside, by using this certificate.

Figure 5:
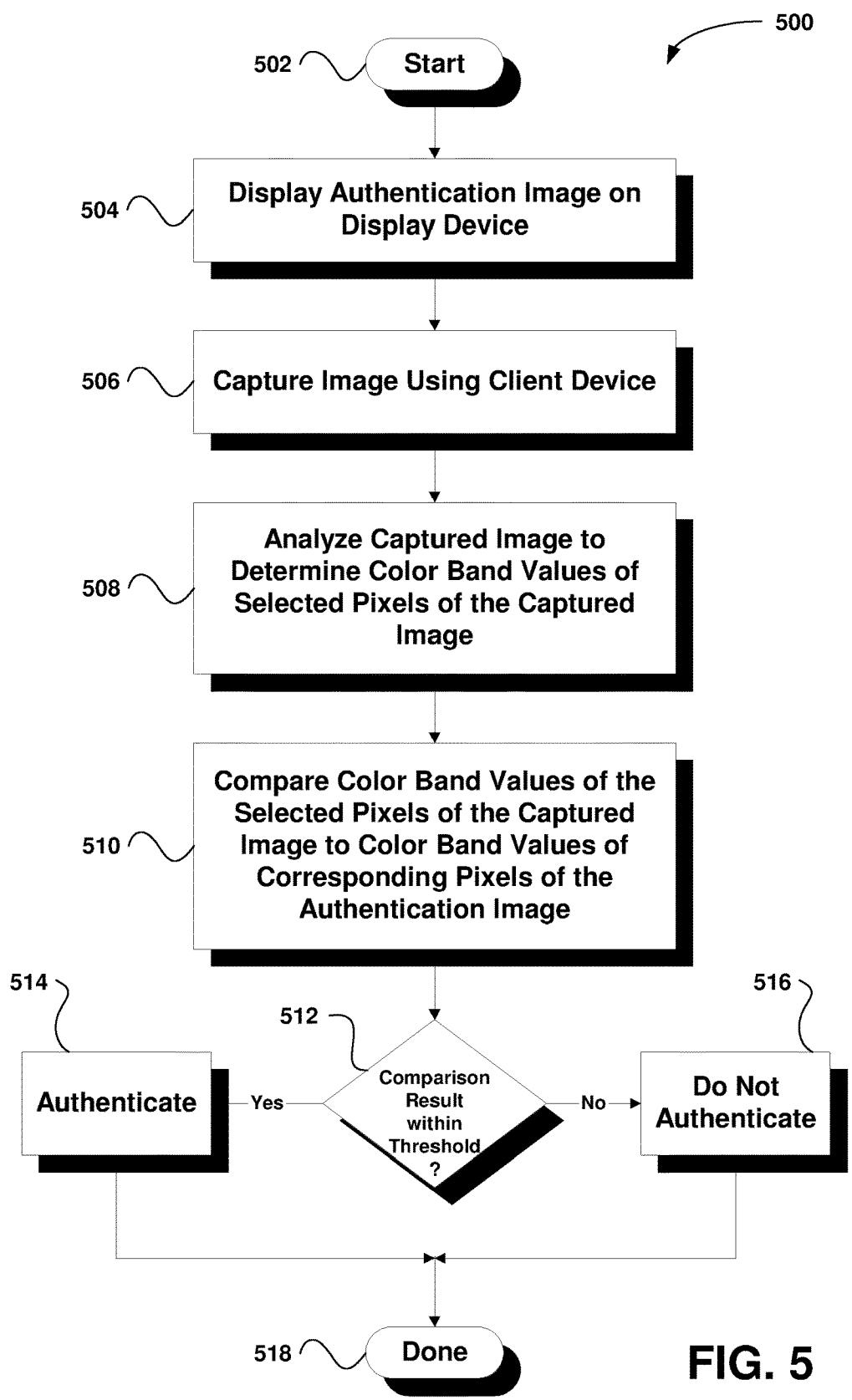
FIG. 5 is a flowchart showing a method for providing authentication in a network environment using multispectral imaging, in accordance with an embodiment of the present invention.

FIG. 5 is a flowchart showing a method 500 for providing authentication in a network environment using multispectral imaging, in accordance with an embodiment of the present invention. In an initial operation 502, preprocess operations are performed. Preprocess operations can include, for example, generating authentication images to use for authentication purposes, determining image cycle time, and installing an authentication application on the client device.

In operation 504, an authentication image is displayed on a display device. As described above, a display device is used to display a static or dynamically changing sequence of colorful, complex authentication images. Ideally, the display device is located in a protected room such that it is not visible to anyone outside the room, even if the door is open.

A remote image server is connected by a VPN to a computer located in a protected space and sends a stream of complex colorful authentication images to the local display device, changing those images once every preset period of time (for example, once every 30 minutes). The remote image server may have a library of one or more such images that it can switch the image to at random for each display period. A record of the image and the time during which it is displayed can be recorded in a local database on the image server.

In operation 506, an image is captured using a client device. A user is granted access to the protected room and must authenticate that they are indeed in the protected room before the user obtains a session certificate from the authentication server that enables the user to connect to the secure VPN server on which reside the files that are being protected. The user begins with a secure VPN connection to the remote image server (or, alternatively, to a local image server) through which authentication data will be sent to the remote authentication server.

Each pixel of the displayed authentication image on the display device has a specific combination color band values, such as the red, green, and blue component color values of RGB color model that creates the sensation of the desired color in the eye of the viewer. In one embodiment of the present invention, the user employs a smartphone running an application associated with the disclosed authentication system. This application captures an image, typically using a built in camera, of the currently displayed authentication image on the display device.

Next, in operation 508, the captured image is analyzed to determine color band values of selected pixels of the captured image. After the application captures the image of the currently displayed authentication image, the application then selects a list of random (or previously assigned) rows and columns of pixels in the captured image and measures the values of the color band values. As noted previously, color band values are numerical values associated with a pixel that define the color of the pixel on the display device. For example, the red, green, and blue component color band values of the RGB color model define the color of a pixel and create the sensation of the desired color in the eye of the viewer.

In an additional embodiment, the three color multispectral imaging is replaced with a multispectral imager that uses more than three color bands. It should be appreciated that in this embodiment, the number of color values reported by the user's smartphone 110 can now be three or more, up to the number of multispectral bands.

In a further embodiment, the three color imager could is replaced with a hyper-spectral imager with hundreds of color bands. It should be appreciated that in this embodiment, the number of color values reported by the user's smartphone 110 can now be three or more, up to the number of hyperspectral bands.

In operation 510, a comparison result is generated by comparing the color band values the selected pixels of the captured image to color band values of corresponding pixels of the authentication image. For example, the red, green, and blue values of each selected pixel is compared to the red, green, and blue values of a corresponding pixel or pixels of the authentication image. The list of differences can be the comparison result. Optionally, the differences can be averaged, or otherwise computed to create a comparison result that can be compared to a predefined threshold.

A decision is then made as to whether the comparison result is within a predefined threshold, in operation 512. For example, if differences are used the threshold can be a number or series of numbers that the comparison result is compared to. If the comparison result is within the threshold, authentication is provided in operation 514. Otherwise authentication is not provided, in operation 516. Post process operations can be performed in operation 518. Post process operations can include, for example, using a certificate to facilitate VPN authentication and access, and other post process operations that will be apparent to those skilled in the art after a careful reading of the present disclosure.

Turning back to FIG. 1, in an additional embodiment the authentication image displayed on the display device 104 can be changed at random by the remote image server 102 at some preset time interval. It should be appreciated that the term "changed" can include the replacement of the displayed image with a new image or some other the modification of the currently displayed image in a random manner than cannot be predicted by the remote user.

In a further embodiment, the continual presence of the authenticated user within the room is checked by employing a short range RF technology, such as Bluetooth or other similar short range technology. Once the person leaves the room and the short range RF technology loses connection, the remote authenticating server immediately revokes the certificate, thereby causing the VPN to the protected file server 108 to vanish.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope of the invention.

What is claimed is:

1. A method for providing location authentication for a remote user in a network environment, comprising:
   displaying an authentication image on a display device located in a specific user location;
   generating a captured image by the remote user when capturing the displayed authentication image using a client device, wherein the remote user is required to be physically within the specific user location for a visible display of the authentication image;
   analyzing the captured image to determine a specific combination of color band values of selected pixels of the captured image;
   generating a comparison result by comparing the color band values of the selected pixels of the captured image to color band values of corresponding pixels of the authentication image; and
   granting the remote user to connect to a server for resource access when the comparison result is within a predetermined threshold so as to provide user location-specific authentication.

2. The method as recited in claim 1, wherein the color band values are red, green, and blue RGB color component values.

3. The method as recited in claim 1, wherein the color band values include four or more values.

4. The method as recited in claim 1, wherein authentication includes providing a session certificate that enables the user to connect to a secure server.

5. The method as recited in claim 1, wherein the authentication image is changed after a predetermined time period.

6. The method as recited in claim 1, wherein the authentication image is changed after a random time period.

7. A system for providing location authentication for a remote user in a network environment, comprising:
   a display device, located in a specific user location, that displays an authentication image, wherein a client device is used by the remote user to generate a captured image by capturing the displayed authentication image, wherein the remote user is required to be physically within the specific user location for a visible display of the authentication image;
   a computer program executing on a hardware processor that analyzes the captured image to determine a specific combination of color band values of selected pixels of the captured image;
   a hardware processor programmed to generate a comparison result by comparing the color band values of the selected pixels of the captured image to color band values of corresponding pixels of the authentication image; and
   an authentication server that provides user location-specific authentication for granting the remote user to connect to a server for resource access when the comparison result is within a predetermined threshold.

8. The system as recited in claim 7, wherein the color band values are red, green, and blue RGB color component values.

9. The system as recited in claim 7, wherein the color band values include four or more values.

10. The system as recited in claim 7, wherein the authentication server provides a session certificate that enables the user to connect to a secure server when the comparison result is within the predetermined threshold.

11. The system as recited in claim 7, wherein the authentication image is changed after a predetermined time period.

12. The system as recited in claim 7, wherein the authentication image is changed after a random time period.

* * * * *